(12) United States Patent
Husain et al.

(10) Patent No.: US 11,178,579 B2
(45) Date of Patent: Nov. 16, 2021

(54) SYSTEM AND METHOD FOR UNMANNED TRANSPORTATION MANAGEMENT

(71) Applicant: SKYGRID, LLC, Austin, TX (US)

(72) Inventors: Syed Mohammad Amir Husain, Georgetown, TX (US); Syed Mohammad Ali, Leander, TX (US); Zehra Akbar, Leander, TX (US)

(73) Assignee: SKYGRID, LLC, Austin, TX (US)

( * ) Notice: Subject to any disclaimer, the term of this patent is extended or adjusted under 35 U.S.C. 154(b) by 44 days.

(21) Appl. No.: 16/365,006

(22) Filed: Mar. 26, 2019

(65) Prior Publication Data

US 2019/0306757 A1 Oct. 3, 2019

Related U.S. Application Data

(60) Provisional application No. 62/648,500, filed on Mar. 27, 2018.

(51) Int. Cl.
| | |
|---|---|
| *H04W 36/00* | (2009.01) |
| *G08G 5/00* | (2006.01) |
| *G05D 1/00* | (2006.01) |
| *H04L 9/06* | (2006.01) |
| *H04W 4/40* | (2018.01) |
| *B64C 39/02* | (2006.01) |

(52) U.S. Cl.
CPC ....... *H04W 36/0009* (2018.08); *B64C 39/024* (2013.01); *G05D 1/0011* (2013.01); *G08G 5/006* (2013.01); *G08G 5/0013* (2013.01); *H04L 9/0643* (2013.01); *H04W 4/40* (2018.02); *B64C 2201/12* (2013.01); *B64C 2201/146* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2016/0161258 A1* | 6/2016 | Magson | G05D 1/0022 701/467 |
| 2017/0103659 A1* | 4/2017 | Jin | B64C 39/024 |
| 2018/0270244 A1* | 9/2018 | Kumar | H04L 9/3239 |

* cited by examiner

*Primary Examiner* — Shripal K Khajuria (57) ABSTRACT

A method includes obtaining route information at an unmanned aerial vehicle (UAV). The route information indicates a plurality of zones between an origin and a destination and a corresponding set of mobile devices for each zone. The method includes receiving first control data at the UAV from a first mobile device while in a first zone of the plurality of zones. The first mobile device is included in a first set of mobile devices corresponding to the first zone. The method further includes receiving second control data at the UAV from a second mobile device while in a second zone of the plurality of zones. The second mobile device is included in a second set of mobile devices corresponding to the second zone.

20 Claims, 7 Drawing Sheets

SYSTEM AND METHOD FOR UNMANNED TRANSPORTATION MANAGEMENT

CROSS-REFERENCE TO RELATED APPLICATION

The present application claims priority from U.S. Provisional Application No. 62/648,500, filed Mar. 27, 2018, entitled "SYSTEM AND METHOD FOR UNMANNED TRANSPORTATION MANAGEMENT," which is incorporated by reference herein in its entirety.

BACKGROUND

Advances in technology have resulted in increased popularity and use of unmanned vehicles, or "drones." Unmanned vehicles, such as self-driving cars or unmanned aerial vehicles (UAVs) enable transportation of people and cargo without requiring control by a pilot within the vehicle. For example, a UAV may be operated by an operator (e.g., a pilot) via a mobile communication device executing an application. One possible use for UAVs is for delivery of goods from one location (an origin) to another location (a destination).

Government regulations, such as Federal Aviation Administration (FAA) regulations in the United States, may limit the operations of UAVs. For example, UAV flights for deliveries may be limited to flights that are within line-of-sight of the pilot controlling the UAV or in some cases first person view within unaided sight (e.g., without binocular assistance). Such restrictions may prevent use of UAVs for deliveries from expanding beyond very short range (e.g., within line-of-sight of a pilot).

SUMMARY

The present application describes systems and methods that enable unmanned transportation management (UTM). The systems and methods disclosed herein enable UAVs to be scheduled for flights and to be controlled by multiple different pilots, which may enable compliance with current and future regulations on UAV operation, including but not limited to line-of-sight regulations. To illustrate, the area between an origin and a destination may be divided into multiple zones, where each zone is a three-dimensional region. Each zone may be associated with a different pilot, and the pilot associated with a particular zone will typically (if not always) be located within that zone. As the UAV travels within a first zone, control of the UAV is granted to a first pilot associated with the first zone. When the UAV travels to a second zone, a handoff operation is performed to handoff control from the first pilot to a second pilot that is associated with the second zone. With the potential exception of border/handoff areas, the UAV does not accept commands from any pilot other than the first pilot while in the first zone and does not accept commands from any pilot other than the second pilot while in the second zone. In some examples as further described herein, one or more backup pilots may also be assigned for a zone and may be available for handoff in the event that the primary pilot for the zone becomes unavailable. In this manner, control of the UAV is handed off from pilot to pilot such that the UAV remains in compliance with regulatory constraints throughout the journey from the origin to the destination. For example, the described techniques may enable at least one pilot to have line-of-sight to the UAV in each zone of travel. Accordingly, the UAV is able to traverse greater distances while maintaining line-of-sight with at least one pilot than if a single pilot operated the UAV from a single location.

In order to ensure that there are a sufficient number of pilots to control a UAV during a flight, the systems and methods disclosed herein enable pilots to indicate their availability and location. Route information is determined for each UAV journey, where the route information includes a route that the UAV will travel in addition to a list of pilots, their locations (e.g., which zone they are located in), and time periods during which the pilots will be expected to control the UAV. To illustrate, each pilot may have a computing device (e.g., a mobile phone, a tablet computer, etc.) that executes a UAV transport service application, and the pilots may use the application to register with the UAV transport service. Registration may include providing evidence of compliance with FAA regulations, such as an FAA UAV operation registration process. After registering, the pilots may use the application to provide availability information indicating times that the pilots are available to pilot UAVS as well as location information (e.g., indicating which zone the pilot will be located in while being available to pilot UAVs).

For a UAV journey, the availability information from the various pilots may be used to determine route information (including pilot assignments), which may be provided to the control devices of the selected pilots. The route information may indicate the route the UAV is to travel, which zones the UAV is scheduled to travel through, the time periods during which the UAV is estimated to travel through each zone, and which pilots are assigned control of the UAV at which times. In some implementations, multiple pilots are assigned to control the UAV in each zone such that there is a primary pilot and one or more backup pilots (to take control in situations in which the primary pilot is unavailable). As the UAV travels through each zone, the UAV only accepts control data from the mobile device of a single pilot assigned to the zone (and discards control data from other sources). Although in many situations the UAV may travel along a designated route without any additional control, in some situations (such as emergency situations or situations in which the UAV is not operating according to the designated route), a pilot may provide control data to the UAV via their mobile device to cause the UAV to perform commands as needed. In some implementations, if the pilot causes the UAV to stop, the route information may be updated when the UAV returns to flight such that the time periods and/or the pilots associated with the route are modified. As the UAV reaches a border between a first zone and a second zone, a handoff operation is performed to handoff control of the UAV from pilot(s) associated with the first zone to pilot(s) associated with the second zone.

In a particular implementation, the described UAV transport system is a distributed system. To illustrate, availability information and route information may be shared between UAVs and control devices using a blockchain. The blockchain enables secure sharing of information in a manner that reduces (or prevents) tampering, as further described herein. In an alternate implementation, a server (or cloud-based service) may receive the availability information from the control devices and may control the routing of the UAVs and the handoff operations.

DETAILED DESCRIPTION

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Figure 1:
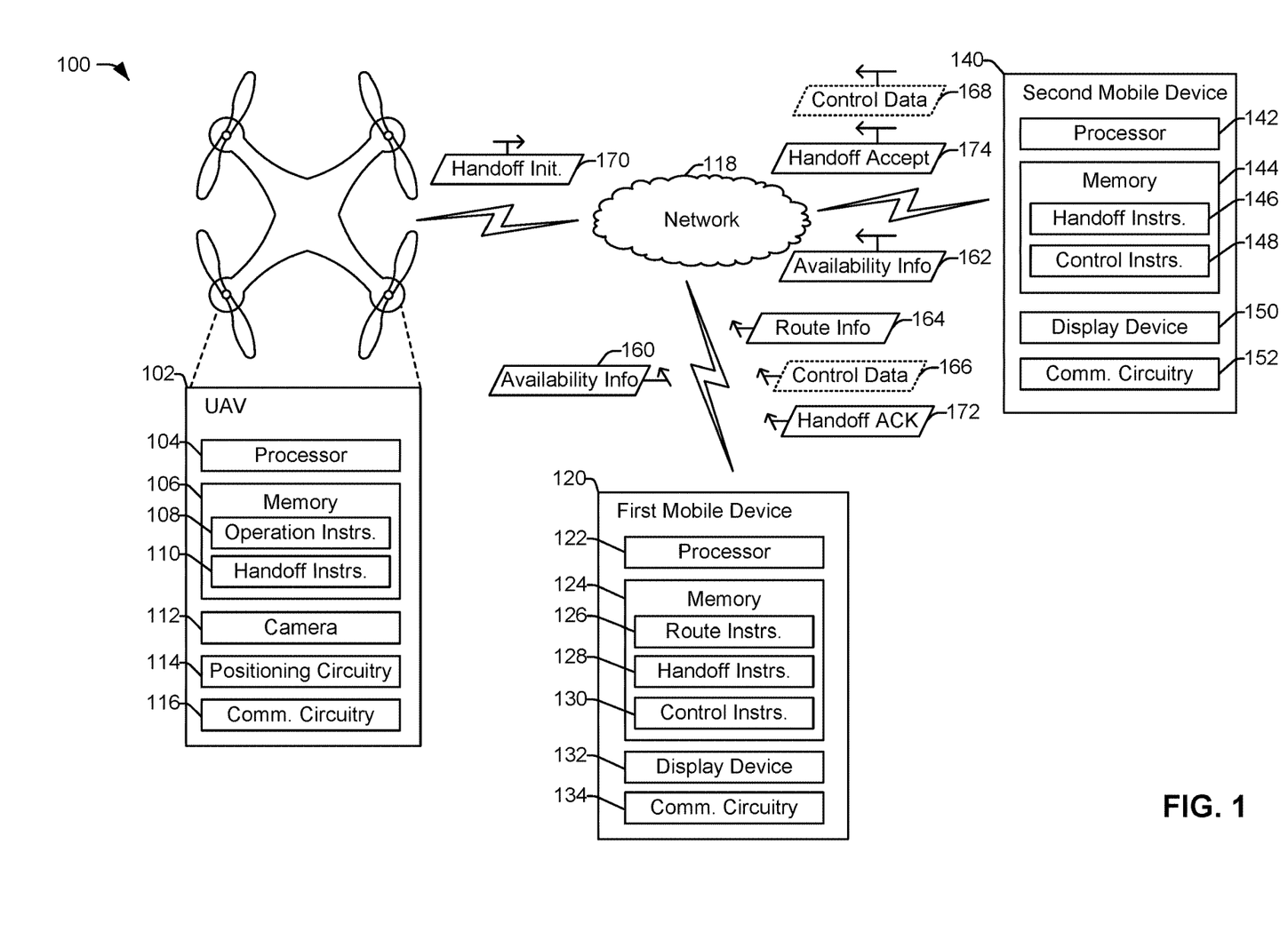
FIG. 1 is a block diagram illustrating a particular implementation of an unmanned vehicle transport system.

Referring to FIG. 1, a particular illustrative example of a system 100 is shown. As described further herein, the system 100 enables scheduling and control of an externally controllable vehicle during operation of the externally controllable vehicle. The externally controllable vehicle may be controllable by one or more control devices external to the externally controllable vehicle during travel of the externally controllable vehicle from an origin location to a destination location. The system 100 depicted in FIG. 1 includes an unmanned aerial vehicle (UAV) 102 as the externally controllable vehicle and a first mobile device 120 and a second mobile device 140 as control devices.

Although the UAV 102 is depicted and described, in other implementations, another type of externally controllable vehicle that can receive and implement control signals from a control device external to the externally controllable vehicle may be used, such as a self-driving car or other land-based vehicle, a self-driving boat or other water-based vehicle, etc. Additionally, or alternatively, the externally controllable vehicle may be fully autonomous or semi-autonomous. A fully autonomous vehicle is a vehicle that operates as an independent agent (e.g., without supervision or control). A semi-autonomous vehicle is a vehicle that operates at least part of the time as an independent agent (e.g., autonomously within some prescribed limits or autonomously but with some supervision). Although referred to as fully autonomous, a fully autonomous vehicle may have control overridden by a pilot during certain situations (e.g., during an emergency situation).

Although a single externally controllable vehicle (the UAV 102) and two control devices (the mobile devices 120 and 140) are illustrated, such illustration is not limiting. In other implementations, the system 100 includes multiple externally controllable vehicles, more than two control devices, or both. For example, multiple UAVs may be scheduled for the same flight or for different flights. As another example, the flight path of a UAV may traverse more than two zones (e.g., regions), and thus more than two pilots, each with a control device, may be used to enable line-of-sight control of the UAV by the pilots at any given time in accordance with the present disclosure. The control devices may include computing devices such as computers, dedicated vehicle controllers, mobile phones, tablet computers, laptop computers, satellite phones, other devices capable of executing instructions to perform the operations described herein, or combinations thereof.

In FIG. 1, the UAV 102 includes a processor 104 coupled to a memory 106, a camera 112, positioning circuitry 114, and communication circuitry 116. The communication circuitry 116 includes a transmitter and a receiver or a combination thereof (e.g., a transceiver). In a particular implementation, the communication circuitry 116 (or the processor 104) is configured to encrypt outgoing message(s) using a private key associated with the UAV 102 and to decrypt incoming message(s) using a public key of a device (e.g., the mobile device 120 or 140) that sent the incoming message(s). Thus, in this implementation, communications between the UAV 102, the first mobile device 120, and the second mobile device 140 are secure and trustworthy (e.g., authenticated).

The camera 112 is configured to capture image(s), video, or both, and can be used as part of a computer vision system. For example, the camera 112 may capture images or video and provide the video or images to a pilot of the UAV 102 to aid with navigation. Additionally or alternatively, the camera 112 may be configured to capture images or video to be used by the processor 104 during performance of one or more operations, such as a landing operation, a takeoff operation, or object/collision avoidance, as non-limiting examples. Although a single camera 112 is shown in FIG. 1, in alternative implementations more and/or different sensors may be used (e.g., infrared, LIDAR, SONAR, etc.).

The positioning circuitry 114 is configured to determine a position of the UAV 102 before, during, and/or after flight. For example, the positioning circuitry 114 may include a global positioning system (GPS) interface or sensor that determines GPS coordinates of the UAV 102. The positioning circuitry 114 may also include gyroscope(s), accelerometer(s), pressure sensor(s), other sensors, or a combination thereof, that may be used to determine the position of the UAV 102.

The processor 104 is configured to execute instructions stored in and retrieved from the memory 106 to perform various operations. For example, the instructions include operation instructions 108 that include instructions or code that cause the UAV 102 to perform flight control operations. The flight control operations may include any operations associated with causing the UAV to fly from an origin to a destination. For example, the flight control operations may include operations to cause the UAV to fly along a designated route (e.g., based on route information, as further described herein), to perform operations based on control data received from one or more control devices, to take off, land, hover, change altitude, change pitch/yaw/roll angles, or any other flight-related operations. The UAV 102 may include one or more actuators, such as one or more flight control actuators, one or more thrust actuators, etc., and execution of the operation instructions 108 may cause the processor 104 to control the one or more actuators to perform the flight control operations. The one or more actuators may include one or more electrical actuators, one or more magnetic actuators, one or more hydraulic actuators, one or more pneumatic actuators, one or more other actuators, or a combination thereof.

The memory 106 also includes handoff instructions 110 that are executable to initiate performance of one or more handoff operations. For example, when the UAV 102 approaches a boundary between two zones, the processor 104 may execute the handoff instructions 110 to perform a handoff operation from the first mobile device 120 to the second mobile device 140, as further described herein. As another example, if a primary pilot of the UAV 102 is unavailable, the processor may execute the handoff instructions 110 to perform a handoff operation to a mobile device of a backup pilot, as further described herein. The handoff instructions 110 (or a portion thereof) may also be executed when receiving a handoff from another mobile device.

The first mobile device 120 includes a processor 122 coupled to a memory 124, a display device 132, and communication circuitry 134. The display device 132 may be a liquid crystal display (LCD) screen, a touch screen, another type of display device, or a combination thereof. The communication circuitry 134 includes a transmitter and a receiver or a combination thereof (e.g., a transceiver). In a particular implementation, the communication circuitry 134 (or the processor 122) is configured to encrypt outgoing message(s) using a private key associated with the first mobile device 120 and to decrypt incoming message(s) using a public key of a device (e.g., the UAV 102 or the second mobile device 140) that sent the incoming message(s). Thus, in this implementation, communication between the UAV 102, the first mobile device 120, and the second mobile device 140 are secure and trustworthy (e.g., authenticated).

The processor 122 is configured to execute instructions from the memory 124 to perform various operations. For example, the instructions include route instructions 126 that include instructions or code that cause the first mobile device 120 to generate route information associated with the UAV 102, as further described herein. The instructions also include handoff instructions 128 that include instructions or code that cause the first mobile device 120 to perform a handoff to another mobile device, such as the second mobile device 140. In some examples such a handoff may be triggered based on elapsing of a designated control time period (e.g., when the UAV 102 leaves a zone associated with the first mobile device 120), as further described herein. The instructions also include control instructions 130 that include instructions or code that cause the first mobile device 120 to generate control data to transmit to the UAV 102 to enable the first mobile device 120 to control one or more operations of the UAV 102 during a particular time period, as further described herein.

The second mobile device 140 includes a processor 142 coupled to a memory 144, a display device 150, and communication circuitry 152. The display device 150 may be a LCD screen, a touch screen, another type of display device, or a combination thereof. The communication circuitry 152 includes a transmitter and a receiver or a combination thereof (e.g., a transceiver). In a particular implementation, the communication circuitry 152 (or the processor 142) is configured to encrypt outgoing message(s) using a private key associated with the second mobile device 140 and to decrypt incoming message(s) using a public key of a device (e.g., the UAV 102 or the first mobile device 120) that sent the incoming message(s). Thus, in this implementation, communication between the UAV 102, the first mobile device 120, and the second mobile device 140 are secure and trustworthy (e.g., authenticated).

The processor 142 is configured to execute instructions from the memory 144 to perform various operations. For example, the instructions include handoff instructions 146 that include instructions or code that cause the second mobile device 140 to perform a handoff to or receive a handoff from another mobile device. In some examples, the handoff may be triggered based on elapsing of a designated control time period (e.g., when the UAV 102 leaves a zone associated with the second mobile device 140), as further described herein. The instructions also include control instructions 148 that include instructions or code that cause the second mobile device 140 to generate control data to transmit to the UAV 102 to enable the second mobile device 140 to control one or more operations of the UAV 102 during a particular time period, as further described herein.

The UAV 102, the first mobile device 120, and second mobile device 140 are communicatively coupled via a network 118. For example, the network 118 may include a satellite network or another type of network that enables wireless communication between the UAV 102, the first mobile device 120, and the second mobile device 140. In in alternative implementation, the mobile devices 120, 140 communicate with the UAV 102 via separate networks (e.g., separate short range networks) and a handoff operation may include the UAV 102 transitioning out of the communication network of one mobile device and into the communication network of another mobile device.

During operation, users of the mobile devices 120, 140 may use the mobile devices 120, 140 to register with the system 100. In some implementations, in order to register, the user provides proof of compliance with a regulatory (e.g., FAA) registration/training requirement as part of the registration process. After registering as a pilot, a first pilot (e.g., a first user) associated with the first mobile device 120 may enter availability times and locations as user input into an application executing at the first mobile device 120, and the first mobile device 120 may generate availability information 160 based on the user input. Similarly, the second mobile device 140 may generate availability information 162 based on information entered by a second pilot (e.g., a second user) associated with the second mobile device 140. The availability information 160, 162 may be transmitted by the respective mobile device 120, 140 to other devices (e.g., the UAV 102 and other control devices) via the network 118. Additionally, the UAV 102, the first mobile device 120, and the second mobile device 140 may perform one or more clock synchronization operations such that respective internal clocks of the UAV 102, the first mobile device 120, and the second mobile device 140 are synchronized. The one or more synchronization operations may be repeated periodically to maintain clock synchronization, at least until a flight of the UAV 102 is complete (or until the unmanned vehicle transportation application is shut down on one of the control devices).

Based on availability information from one or more of the mobile devices 120, 140 of the system 100, route and pilot information associated with a scheduled flight of the UAV 102 may be determined. To illustrate, the first mobile device 120 may generate route information 164. The route information 164 may indicate a starting point (e.g., an origin) and an ending point (e.g., a destination) for the UAV 102. Additionally, the route information 164 may indicate a plurality of zones (e.g., regions or areas) between the origin and the destination. For example, each zone may have a size that corresponds to a line-of-sight distance from one or more points within the zone. In a particular implementation, each zone may cover a distance of approximately 1 mile, approximately 2 miles, or approximately 5 miles (based on terrain of the zones). The zones may be established such that a pilot in a designated position within a zone has a clean line-of-sight to the boundaries of the zone. Zones may be similar in size or may be different in size. In some implementations, two or more zones may be differently sized but may be similar in terms of expected flight duration for the UAV 102 to pass through each of the zones.

The route information 164 also indicates a corresponding set of control devices for each of the plurality of zones. The indicated sets of control devices are associated with a pilot (and optionally one or more backup pilots) assigned to have control over the UAV 102 while the UAV 102 is in each zone. The route information 164 may also indicate time periods during which the UAV is scheduled to be in each of the zones (and thus time periods assigned to each pilot or set of pilots).

Figure 3:
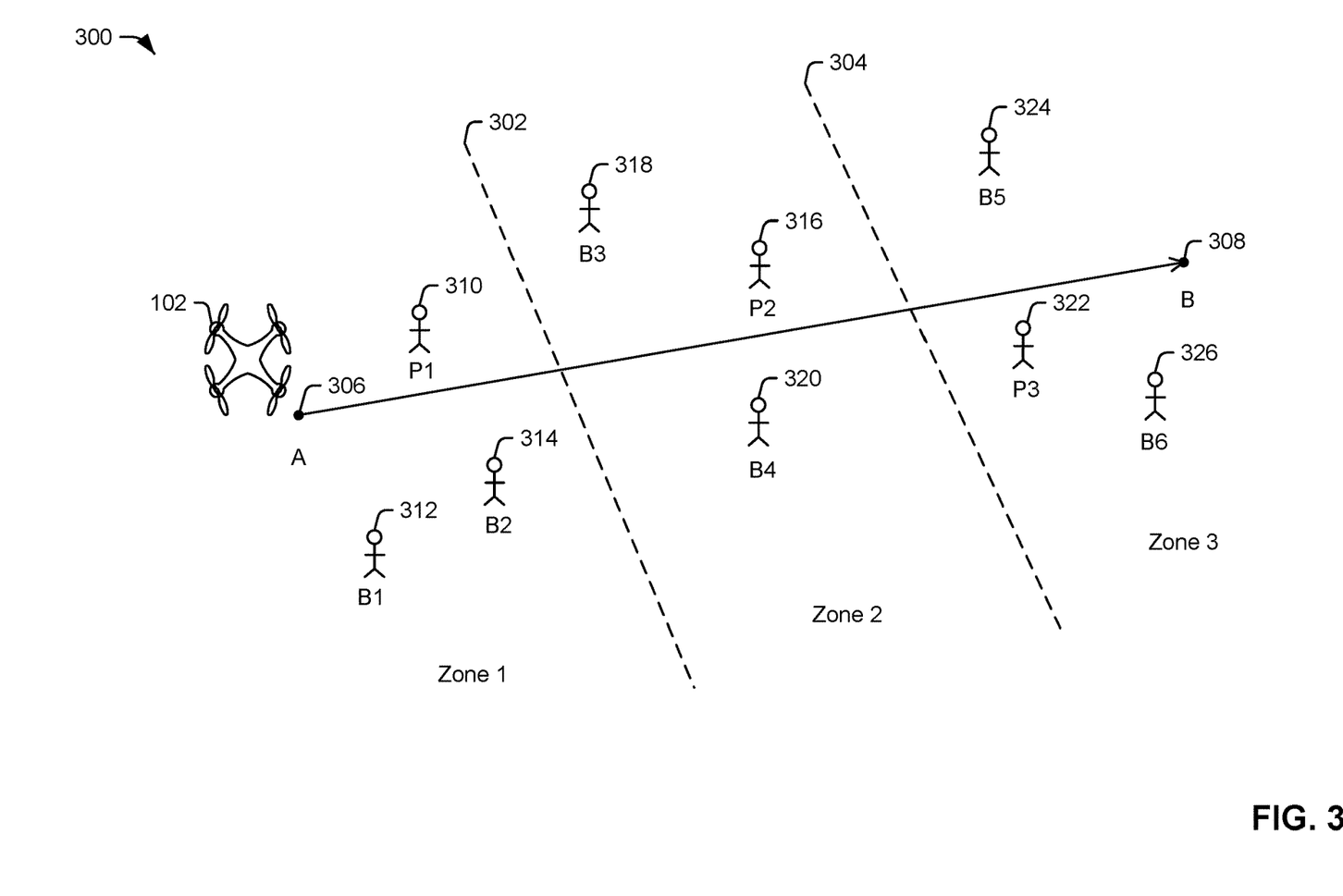
FIG. 3 is a diagram to illustrate an example of a flight path of a UAV and zone assignments of pilots.

An example flight path and zone assignments of pilots are illustrated in a diagram 300 of FIG. 3. To illustrate, the UAV 102 may be scheduled to travel from an origin 306 (point A) to a destination 308 (point B). A plurality of zones may be located between the origin 306 and the destination 308. In the example illustrated in FIG. 3, the plurality of zones includes three zones: zone 1, zone 2, and zone 3. Although three zones are illustrated, this is for illustrative purposes only, and the plurality of zones may include more than three or fewer than three zones. Each zone may be 1 mile across, 2 miles across, 5 miles across, or any distance that enables a pilot at one or more locations in each zone to have line-of-sight across the entire zone. In the example of FIG. 3, zone 1 is separated from zone 2 by a first boundary 302, and zone 2 is separated from zone 3 by a second boundary 304 (though illustrated in FIG. 3 as straight lines, it is to be understood that boundaries may not always be straight lines/planes).

The UAV 102 may receive the route information 164 indicating the route (e.g., flight path) from the origin 306 to the destination 308. The route information 164 may also include pilot assignments associated with the route. To illustrate, the UAV 102 may be scheduled to fly through zone 1 at a particular time, and the route information 164 may indicate the particular time and a first set of pilots that are assigned to the particular time. The assignments may be based on availability information from each of the pilots involved, and assignments are included for each zone between the origin 306 and the destination 308. In some implementations, the assignments may include a buffer period to reduce (or eliminate) a possibility that the UAV 102 will not have a pilot at any given time. For example, if the UAV 102 is scheduled to fly through zone 1 at 12:00 pm to 12:15 pm, to fly through zone 2 at 12:15 pm to 12:30 pm, and to fly through zone 3 from 12:31 pm to 12:45 pm, a first set of pilots may be assigned for zone 1 from 11:50 pm to 12:25 pm (e.g., there may be a 10 minute buffer before and after the designated flight time), a second set of pilots may be assigned for zone 2 from 12:05 pm to 12:40 pm, and a third set of pilots may be assigned for zone 3 from 12:20 pm to 12:55 pm.

In a particular implementation, each set of pilots may include one primary pilot and at least one backup pilot. As an example, the first set of pilots assigned to zone 1 may include a first primary pilot 310 (P1), a first backup pilot 312 (B1), and a second backup pilot 314 (B2). The second set of pilots assigned to zone 2 may include a second primary pilot 316 (P2), a third backup pilot 318 (B3), and a fourth backup pilot 320 (B4). The third set of pilots assigned to zone 3 may include a third primary pilot 322 (P3), a fifth backup pilot 324 (B5), and a sixth backup pilot 326 (B6). Although one primary pilot and two backup pilots are illustrated for each zone, in other implementations, more than three or fewer than three pilots may be assigned to each zone. The pilots may be located in the same or different locations within the zone, as long as each pilot has a clear line-of-sight to the entirety of the zone. Each pilot may use a mobile device (e.g., a computing device) to execute an unmanned vehicle guidance application in order to indicate availability, receive assignments, observe the UAV 102, and take control of the UAV 102. For example, the first primary pilot 310 may use the first mobile device 120 and the second primary pilot 316 may use the second mobile device 140 of FIG. 1. In some implementations, a pilot may actively control the UAV 102 throughout its journey through a zone. Alternatively, a pilot may observe the UAV 102 while the UAV is in the pilot's zone (the UAV 102 may autopilot through the zone) and may actively control the UAV 102 only if needed. In some implementations, an auditor may be assigned to each route, or to each zone, to oversee that the pilots are available during their designated times and at their designated locations, to oversee handoffs, to initiate handoffs to backup pilots (if needed), to provide payment to the pilots, or to perform other operations associated with facilitating the journey of the UAV 102.

To illustrate, the UAV 102 may be configured to fly from the origin 306 to the destination 308 without additional manual input from any assigned pilot. However, the UAV 102 may also be configured to respond to control data (e.g., commands) from a pilot of the set of pilots (e.g., the set of control devices) that correspond to a current time period/zone. For example, during a first time period while the UAV 102 is located within zone 1, the UAV 102 may be responsive to the control data 166 from the first mobile device 120 (or to control data from mobile device of the first backup pilot 312 or the second backup pilot 314). During the first time period, the UAV 102 may discard control information from other sources. For example, if the second mobile device 140 (of the second primary pilot 316) transmits the control data 168 during the first time period, the UAV 102 may discard the control data 168 because it comes from a source that is not designated to the first time period. In an illustrative example, the UAV 102 may verify the control data 166 from the first mobile device based on public/private key encryption or another security mechanism. The UAV 102 may also operate to mitigate the possibility of a distributed denial of service (DDoS) attack on the UAV 102 by unauthorized pilots. As an illustrative example, the UAV 102 may use a frequency hopping schedule that is known only to the UAV 102 and the authorized pilot and that is derived based on identifiers/keys associated with the UAV 102 and/or the mobile device of the authorized pilot. As another example, the UAV 102 may use a directional antenna that is "pointed towards" the location of the authorized pilot.

As the UAV 102 approaches the first boundary 302, a handoff procedure may be initiated. For example, the UAV 102 may transmit a handoff initiation 170 (e.g., an indicator). The handoff initiation 170 may be received by the first set of control devices (including the first mobile device 120) and the second set of control devices (including the second mobile device 140). The handoff initiation 170 may be processed by the first set of control devices to generate an indicator to the pilot that control of the UAV 102 is about to be terminated (e.g., at the end of the first time period). For example, the first mobile device 120 may, responsive to receiving the handoff initiation 170, display a message indicating that control of the UAV 102 is being handed off from the first mobile device 120 to a different mobile device and that control of the UAV 102 will no longer be allowed by the first mobile device 120.

In some implementations, the message may indicate an estimated amount of time until control of the UAV is no longer allowed by the first mobile device 120. Additionally, the message may include a prompt for the pilot to acknowledge the upcoming handoff. For example, the first primary pilot 310 may provide a user input to the first mobile device 120 that indicates that the pilot acknowledges the handoff, and the first mobile device 120 may transmit a handoff acknowledgement 172. In some implementations, a small buffer period may occur where control of the UAV is accepted from a first particular device of the first set of control devices and from a second particular device of the second set of control devices, which may increase the probability that at least one mobile device has control of the UAV 102 at any given time.

After the expiration of the first time period, the control device of the first set of control devices that could previously control the UAV 102 may display a message (e.g., an end message) indicating that control of the UAV 102 is no longer accepted from the control device (e.g., an inability of the first mobile device 120 to control the UAV 102). In addition, a message indicating a credit to an account of the pilot (or other form of payment) may be displayed. To illustrate, each pilot and backup pilot may receive payment for completing the designated time period and performing any controls as needed for the UAV 102.

The handoff initiation 170 may also be received by one or more control devices of the second set of control devices (including the second mobile device 140). The handoff initiation may be initiated before the UAV 102 crosses into a new zone. The handoff initiation 170 may be processed by the second set of control devices to generate an indicator to a pilot that control of the UAV 102 is about to be initiated (e.g., at the beginning of the second time period). For example, the second mobile device 140 may, responsive to receiving the handoff initiation 170, display a message (e.g., a control notification) that informs a user of the second mobile device 140 that control of the UAV 102 is being handed off to the second mobile device 140 from a different control device. In some implementations, the message may indicate an estimated amount of time until control of the UAV is permitted by the second mobile device 140. Additionally, the message may include a prompt for the pilot to accept the upcoming handoff. For example, the second primary pilot 316 may provide a user input to the second mobile device 140 that indicates that the pilot accepts the handoff, and the second mobile device 140 may transmit a handoff acceptance 174. In a particular implementation, if the handoff acceptance 174 is not received by the UAV 102, the UAV 102 sends a message to the control device of the first backup pilot 312 indicating that they are now designated as the primary pilot for zone 2. When the UAV 102 receives the handoff acceptance 174 from the second mobile device 140, the UAV 102 may provide status data to the second mobile device 140. The status data may include sensor data, camera data, and other information that enables the pilot associated with the second mobile device 140 to react appropriately when the pilot associated with the second mobile device 140 is able to control the UAV 102.

In some implementations, the handoff initiation 170 may be sent to all control devices in the second set, and a particular control device of the second set that will have the ability to control the UAV 102 after the handoff is the first control device of the second set from which the UAV 102 receives a response. Should the UAV 102 not receive handoff acceptance from any control device of the second set, the UAV 102 may send a notice to a control device associated with the current pilot (e.g., the mobile device 120) informing the current pilot that a subsequent pilot cannot be found. The notice may indicate that the UAV 102 will initiate a particular course of action (e.g., hovering, landing, entering a holding pattern, or combinations thereof), may request a course of action from the pilot, or both.

After the expiration of the first time period (e.g., at the start of the second time period), the second mobile device 140 (i.e., the control device of the second set of control devices that was accepted by the UAV 102 to control the UAV 102) may display a message indicating that control of the UAV 102 is now permitted. Control of the UAV 102 may remain with the second mobile device 140 until the expiration of the second time period (e.g., when the UAV 102 crosses the second boundary 304 into zone 3). As the UAV approaches the second boundary 304, a handoff operation may be initiated to handoff control from the second mobile device 140 to a particular control device of a third set of mobile devices, similar to as described above. Control of the UAV 102 may then reside with the particular control device of the third set of control devices until the UAV 102 reaches the destination 308 or passes into another zone. In this manner, control of the UAV 102 is handed off from a control device of one set of control devices (e.g., from one set of pilots) to a different control device of another set of control devices (e.g., to a different set of pilots) each time the UAV enters a different zone. By handing off control of the UAV 102 in this fashion, the UAV 102 is within a line-of-sight of a current pilot at any given time, thereby complying with the FAA line-of-sight rule.

It is to be understood that the above description of messaging during handoff is for illustration only and is not to be considered limiting. In alternative implementations, handoff may be initiated by a control device rather than the UAV 102. For example, the first mobile device 120 may monitor a position of the UAV 102 and when the UAV 102 is approaching the boundary to another zone, the first mobile device 120 may send a handoff initiation message to the second mobile device 140 based on information in the route information 164. The second mobile device 140 may send the handoff acceptance message to the first mobile device 120, the UAV 102, or both. If the second mobile device 140 does not respond to the handoff initiation message or declines to accept the handoff, the first mobile device 120 may send another handoff initiation message to a backup control device identified in the route information 164. In some examples, handoff is both horizontal (pilot/control device to pilot/control device) as well as vertical (one network or networking technology to another network or networking technology). To illustrate, a handoff of the UAV 102 in accordance with the present disclosure may include the UAV transitioning from short area network communication with a control device of one pilot to satellite communication with a control device of another pilot. In such scenarios, association/authentication with the new network may occur during the handoff procedure.

In some situations, minimal (or no) manual control of the UAV 102 may be performed, and the UAV 102 may travel from the origin 306 to the destination 308 without incident. However, in some situations, one or more of the pilots may control the UAV 102 during the associated time period, such as to perform object avoidance or to compensate for an improper UAV operation. In some situations, the UAV 102 may be temporarily stopped, such as during an emergency condition, for recharging, for refueling, to avoid adverse weather conditions, responsive to one or more status indicators from the UAV 102, etc. For example, while the UAV 102 is in zone 2, the second mobile device 140 may receive an alert indicating to stop the UAV 102. The second primary pilot 316 may cause the second mobile device 140 to transmit the control data 168 to stop (e.g., hover or land) the UAV 102 at a particular location in zone 2 based on the alert. After a time period associated with the alert has passed, the UAV 102 may be returned to the route to the destination. In some implementations, due to the unscheduled stop, the route information 164 may be updated (e.g., via a subsequent blockchain entry, as further described herein) by the UAV 102 or by the second mobile device 140 (if the second primary pilot 316 manually updates the information). The updated route information may include updated time periods, updated pilot assignments, or both.

Returning to FIG. 1, in a particular implementation, the availability information and the route information are exchanged using a blockchain data structure. The blockchain data structure is shared in a distributed manner across a plurality of devices of the system 100, such as the UAV 102, the first mobile device 120, the second mobile device 140, and any other control devices or UAVs in the system 100. In a particular implementation, each of the devices of the system 100 stores an instance of the blockchain data structure in a local memory of the respective device. In other implementations, each of the devices of the system 100 stores a portion of the shared blockchain data structure and each portion is replicated across multiple of the devices of the system 100 in a manner that maintains security of the shared blockchain data structure as a public (i.e., available to other devices) and incorruptible (or tamper evident) ledger.

Figure 4:
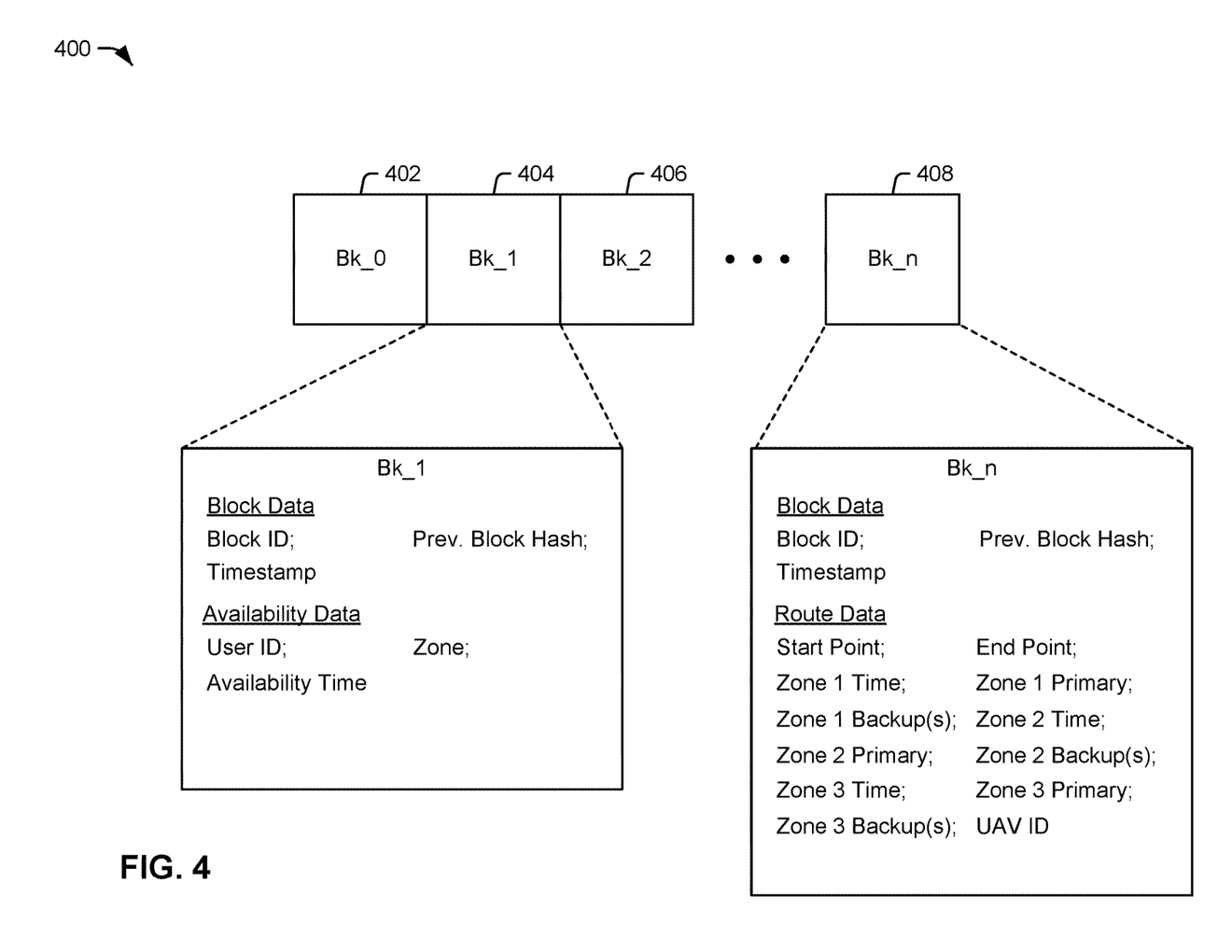
FIG. 4 is a diagram to illustrate a particular implementation of blockchain-based operations used by the unmanned vehicle transport system of FIG. 1.

The blockchain data structure may include, among other things, availability information transmitted by the mobile devices 120, 140 and route information associated with the UAV 102. For example, the availability information 160, the availability information 162, or the route information 164 are used to generate blocks of the blockchain data structure. A sample blockchain data structure 400 is illustrated in FIG. 4. Each block of the blockchain data structure 400 includes block data and other data, such as availability data or route data.

The block data of each block includes information that identifies the block (e.g., a block ID) and enables the devices of the system 100 to confirm the integrity of the blockchain data structure 400. For example, the block data also includes a timestamp and a previous block hash. The timestamp indicates a time that the block was created. The block ID may include or correspond to a result of a hash function (e.g., a SHA256 hash function, a RIPEMD hash function, etc.) based on the other information (e.g., the availability data or the route data) in the block and the previous block hash (e.g., the block ID of the previous block). For example, in FIG. 4, the blockchain data structure 400 includes an initial block (Bk_0) 402 and several subsequent blocks, including a block Bk_1 404, a block Bk_2 406, and a block Bk_n 408. The initial block Bk_0 402 includes an initial set of availability data or route data, a timestamp, and a hash value (e.g., a block ID) based on the initial set of availability data or route data. The block Bk_1 404 also includes a hash value based on the other data of the block Bk_1 404 and the previous hash value from the initial block Bk_0 402. Similarly, the block Bk_2 406 other data and a hash value based on the other data of the block Bk_2 406 and the previous hash value from the block Bk_1 404. The block Bk_n 408 includes other data and a hash value based on the other data of the block Bk_n 408 and the hash value from the immediately prior block (e.g., a block Bk_n−1). This chained arrangement of hash values enables each block to be validated with respect to the entire blockchain; thus, tampering with or modifying values in any block of the blockchain is evident by calculating and verifying the hash value of the final block in the block chain. Accordingly, the blockchain acts as a tamper-evident public ledger of availability data and route data for the system 100.

In addition to the block data, each block of the blockchain data structure 400 includes availability data or route data. For example, the block Bk_1 404 includes availability data that includes a user ID (e.g., an identifier of the mobile device, or the pilot, that generated the availability data), a zone (e.g., a zone at which the pilot will be available), and an availability time (e.g., a time period the pilot is available at the zone to pilot a UAV). As another example, the block Bk_n 408 includes route data that includes a UAV ID, a start point, an end point, and time periods, primary pilot assignments, and backup pilot assignments for each zone associated with the route. Referring to the example of FIG. 3, the route data may include the origin 306, the destination 308, a zone 1 time (11:50 am-12:25 pm), a zone 1 primary pilot (the first primary pilot 310), one or more zone 1 backup pilots (the first backup pilot 312 and the second backup pilot 314), a zone 2 time (12:05 pm-12:40 pm), a zone 2 primary pilot (the second primary pilot 316), one or more zone 2 backup pilots (the third backup pilot 318 and the fourth backup pilot 320), a zone 3 time (12:20 pm-12:55 pm), a zone 3 primary pilot (the third primary pilot 322), and one or more zone 3 backup pilots (the fifth backup pilot 324 and the sixth backup pilot 326).

Returning to FIG. 1, in some implementations, each device of the system 100 may include a block buffer, which may be a separate portion of local memory at the device, as a non-limiting example. Each time the device receives availability information or route information, the device may store the availability information or the route information in the buffer. The devices may be configured to determine when a block forming trigger satisfies a block forming condition. The block forming trigger may include or correspond to a count of availability information or route information that is stored in the block buffer, a count of availability information or route information received since the last block was added to the blockchain, a time interval since the last block was added to the block chain, another criterion, or a combination thereof. If the block forming trigger corresponds to a count (e.g., of received availability information or route information), the block forming condition corresponds to a threshold value for the count. In some implementations, the threshold value is based on the number of devices in the system 100. For example, the threshold value may correspond to a simple majority of the devices of the system 100 or a specified fraction of the devices of the system 100. In some implementations, information may be removed from the block buffer if the information is not used to generate a new block within a threshold time period.

In a particular implementation, when the block forming condition is satisfied, the respective device may form a block using the data from the block buffer. The block may then be transmitted to other devices in the system 100. Since each of the devices of the system 100 attempts to form a block when its respective block forming condition is satisfied, and since the block forming conditions may be satisfied at different times, block conflicts can arise. A block conflict refers to a circumstance in which a first device forms and sends a first block and concurrently, or nearly concurrently, a second device forms and sends a second block that is different than the first block. In this circumstance, some devices of the system 100 receive the first block before the second block while other devices receive the second block before the first block. In this circumstance, both the first block and the second block may be provisionally added to the blockchain, causing the blockchain to branch. The branching is resolved when the next block is added to the end of one of the branches such that one branch is longer than the other (or others). In this circumstance, the longest branch is designated as the main branch. When the longest branch is selected, any availability information or route information that corresponds to a shorter branch and that is not accounted for in the longest branch may be returned to the block buffer.

Thus, in some implementations, the availability information and route information associated with the UAV 102 is stored in a blockchain that is distributed across the devices of the system 100. In this manner, the information is public and tamper-evident, and thus may be treated as secure. In some implementations, private keys and public keys are used to encrypt and decrypt data corresponding to the blockchain. For example, a new block may be encrypted with a private key of the device that transmits the new block, and the other devices may decrypt the new block using the public key of the device that transmits the new block.

In this manner, FIG. 1 represents an autonomous vehicle transport system that enables generation of route information associated with a delivery route (or other flight path) of the UAV 102. As described above, the system 100 enables handoff of control of the UAV between different sets of control devices (associated with different sets of pilots) as the UAV 102 travels in different zones. Because the control is handed off to between multiple pilots, the UAV 102 may travel a distance that is greater than the line-of-sight of any one pilot while still complying with a line-of-sight regulation (e.g., the UAV 102 may be within a line-of-sight of at least one pilot at all times).

Figure 2:
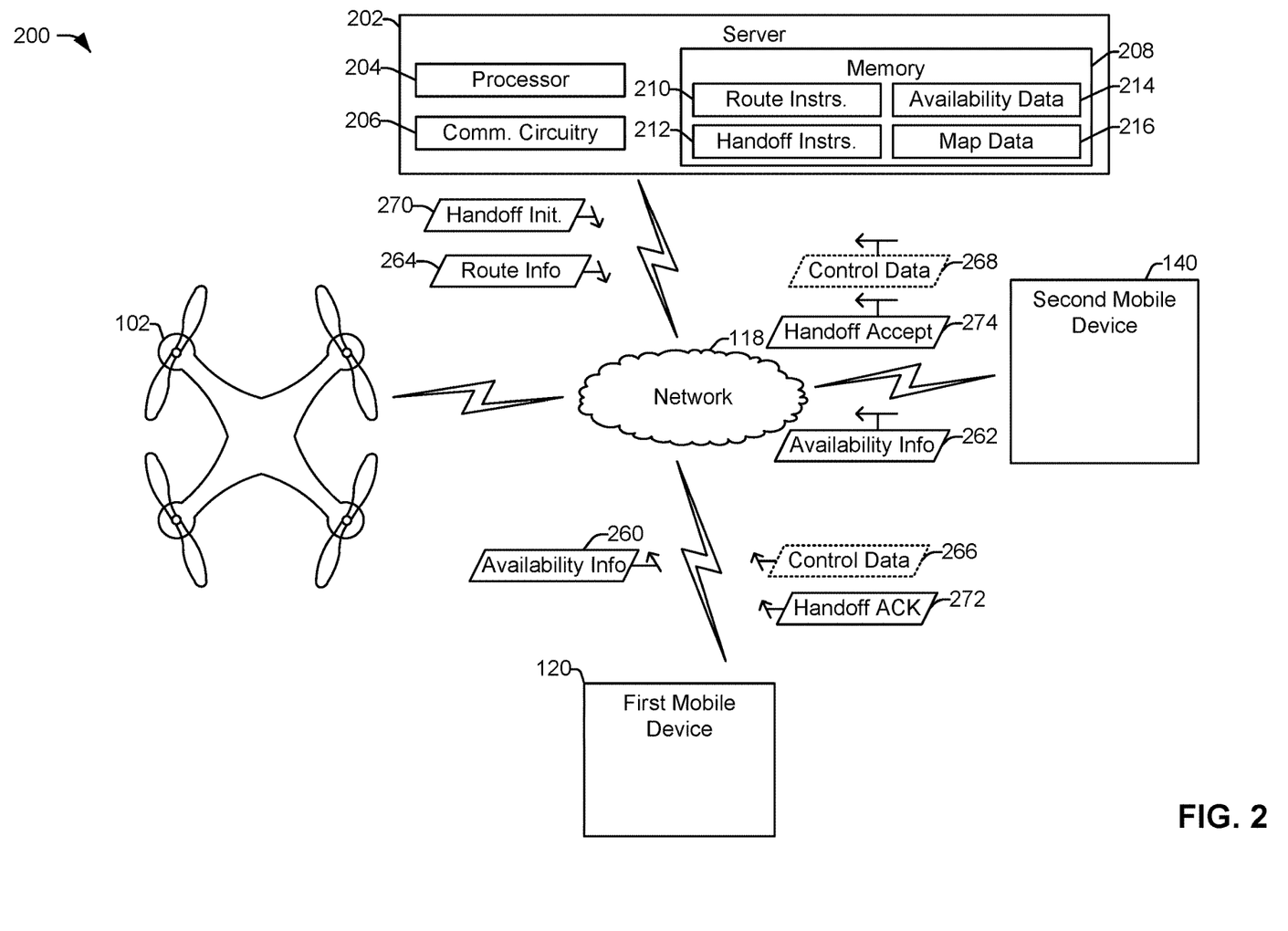
FIG. 2 is a block diagram illustrating another particular implementation of an unmanned vehicle transport system.

Referring to FIG. 2, a particular illustrative example of a system 200 is shown. As compared to the system 100 of FIG. 1, which stored availability information and route information in a distributed manner, the system 200 includes a centralized server 202 (or a cloud based service accessible via the server 202) to perform the route determination and pilot assignment operations described with reference to FIG. 1. The system 200 includes the UAV 102, the first mobile device 120, the second mobile device 140, and the server 202. The UAV 102, the first mobile device 120, and the second mobile device 140 include the components described with reference to FIG. 1.

The server 202 includes a processor 204 coupled to a memory 208 and communication circuitry 206. The communication circuitry 206 includes a transmitter and a receiver or a combination thereof (e.g., a transceiver). In a particular implementation, the communication circuitry 206 (or the processor 204) is configured to encrypt outgoing message(s) using a private key associated with the server 202 and to decrypt incoming message(s) using a public key of a device (e.g., the UAV 102, the first mobile device 120, or the second mobile device 140) that sent the incoming message(s). Thus, in this implementation, communication between the UAV 102, the first mobile device 120, the second mobile device 140, and the server 202 are secure and trustworthy (e.g., authenticated).

The processor 204 is configured to execute instructions from the memory 208 to perform various operations. For example, the instructions include route instructions 210 that include instructions or code that cause the server 202 to generate route information associated with the UAV 102, as described with reference to FIG. 1. The instructions also include handoff instructions 212 that include instructions or code that cause the server 202 to facilitate handoff operations between control devices when the UAV 102 travels between zones, as described above. The memory 208 is also configured to store availability data 214 and map data 216, which may be used to generate route information.

During operation, the first mobile device 120 may transmit availability information 260 indicating availability time period(s) and location(s) of a pilot associated with the first mobile device 120. Similarly, the second mobile device 140 may transmit availability information 262 indicating availability time period(s) and location(s) of a pilot associated with the second mobile device 140. The server 202 may store the availability information 260, 262 as the availability data 214. Additionally, the server 202 may store the map data 216 that indicates locations of each zone. When a route for the UAV 102 is requested, the availability data 214 and the map data 216 are used to determine route information 264 that is transmitted to the UAV 102, the first mobile device 120, and the second mobile device 140. The route information 264 may indicate the route the UAV is scheduled to travel, as well as pilot assignments associated with the route, as described with reference to FIG. 1. The server 202 may also provision and transmit (or the route information may also include) device identifiers of the control devices associated with the assigned pilots and of the UAV 102. For example, the server 202 may provide identifiers of the first mobile device 120 and the second mobile device 140 to the UAV 102. The server may also provide an identifier of the UAV 102 to the first mobile device 120 and to the second mobile device 140. Providing the device identifiers may enable the UAV 102 to establish communication links with the first mobile device 120 and with the second mobile device 140, which enables communication of control data to the UAV 102 from the first mobile device 120 or the second mobile device 140.

In some implementations, a blockchain may be maintained by the server 202, the UAV 102, the first mobile device 120, and the second mobile device 140. In such implementations, the server 202 may publish the route information 264 by adding a block to the blockchain, such that the route information 264 is maintained in a tamper-proof manner. Using a blockchain to transmit the route information 264 and/or device identifiers may enable such information to be tamper proof. In other implementations, the server 202 publishes the route information without use of a blockchain. Thus, in some implementations, the server 202 may be an intermediary that acts as a long range single point of contact facilitating blockchain-based or non-blockchain-based indirect communication between control devices and UAVs.

Additionally, the server 202 may facilitate or handle handoff operations. To illustrate, during a first time period, the UAV 102 may fly through zone 1 and be responsive to control data 266 from the first mobile device 120. As the UAV 102 approaches the boundary between zone 1 and zone 2 (e.g., as the first time period nears expiration), the server 202 may transmit a handoff initialization 270 (e.g., an indicator) to coordinate a handoff of control of the UAV 102 from the first mobile device 120 to the second mobile device 140. For example, the first mobile device 120 may transmit a handoff acknowledgement 272 responsive to receiving the handoff initialization 270 (indicating that the pilot associated with the first mobile device 120 acknowledges that control is about to be handed off to another pilot), and the second mobile device 140 may transmit a handoff acceptance 274 (indicating that the pilot associated with the second mobile device 140 accepts that control of the UAV 102 is about to be handed off to the second mobile device 140). After the handoff operation, the UAV 102 may be responsive to control data 268 from the second mobile device 140.

Thus, FIG. 2 illustrates a system 200 that includes a centralized server 202 to perform the routing and pilot designation operations. Using a centralized server instead of a distributed storage technique may reduce overhead and computational complexity at the UAV 102, the first mobile device 120, and the second mobile device 140. In some implementations, route information may be distributed using memory cards or other removable memories. For example, the UAV 102 may be configured to access a memory card (or other removable memory) that stores the route information and any other relevant information (e.g., the assigned pilots, the time periods, identifiers of the control devices associated with the assigned pilots, etc.). It is to be understood that a payload being delivered by the UAV may include a physical payload (e.g., box or package) and/or a data payload that is stored in a fixed or removable memory of the UAV. In some examples, the data payload may be encrypted based on key(s) associated with a sender and/or recipient of the data, and may be erased from the UAV's memory upon successful delivery.

Figure 5:
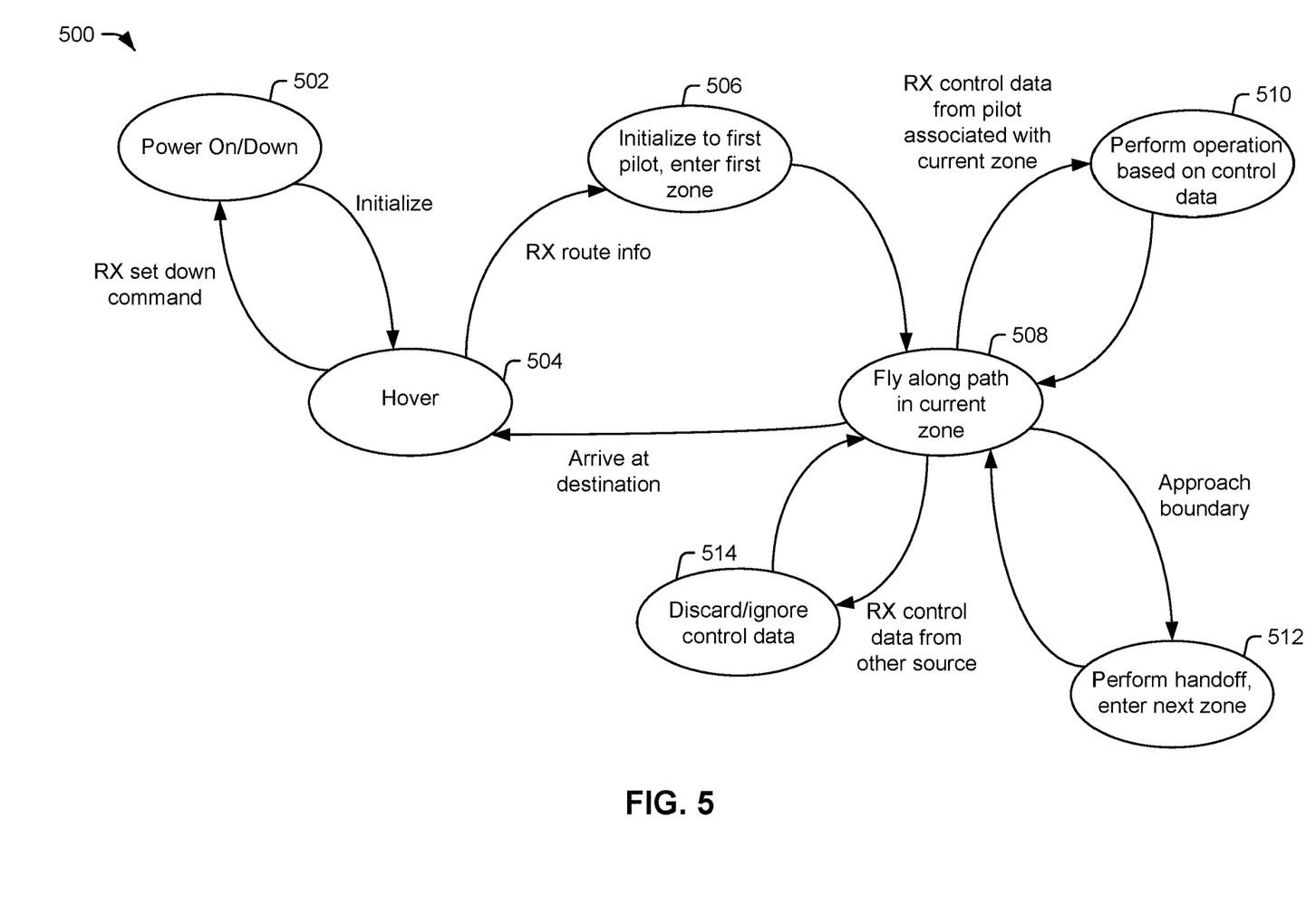
FIG. 5 is a state diagram illustrating a particular implementation of operations at the UAV of FIG. 1.

Referring to FIG. 5, a particular example 500 of operations of a UAV (e.g., the UAV 102 of FIG. 1) is shown. FIG. 5 illustrates a plurality of operating states of the UAV 102. A current operating state of the UAV 102 may change from state to state as illustrated in FIG. 5.

At 502, the UAV 102 may be powered on. Upon initialization, the UAV 102 may transition to a hover state, at 504. The UAV 102 may hover until route information is received or until a set down (e.g., land or power down) command is received.

Upon receipt of route information, the UAV initializes to a first set of pilots and begins flying in a first zone, at 506. For example, the UAV 102 may receive the route information 164 from the first mobile device 120 of FIG. 1 or the route information 264 from the server 202 of FIG. 2. The route information may indicate a plurality of zones between an origin of the UAV 102 and a destination of the UAV 102 and a set of pilots that are assigned to each zone. The plurality of zones includes a first zone and a first set of pilots designated for the first zone.

After the UAV 102 is initialized to the first set of pilots, the UAV 102 begins flying along a path to the destination in a current zone, at 508. To illustrate, the UAV 102 may climb to an altitude indicated in the route information and may begin to travel along a vector indicated in the route information. The UAV 102 is configured to respond to control data from the set of pilots associated with the current zone and not from other sources. If the UAV 102 receives control data from a pilot associated with the current zone, the UAV 102 performs one or more operations based on the control data, at 510. For example, the UAV 102 may fly in the first zone (e.g., during a first time period) and receive the control data 166 from the first mobile device 120 to cause the UAV 102 to perform one or more operations based on the control data 166. To illustrate, the UAV 102 may adjust an altitude of the UAV 102, adjust a heading of the UAV 102, adjust a velocity of the UAV 102, hover, land, or a combination thereof, based on the control data 166. After performing the one or more operations, the UAV 102 returns to flying along the path in the current zone, at 508.

If the UAV 102 receives control data from a pilot that is not associated with the current zone, the UAV 102 discards or ignores the control data, at 514. For example, the UAV 102 may fly in the first zone (e.g., during a first time period) and receive the control data 168 from the second mobile device 140. The UAV 102 may discard or otherwise ignore the control data 168 because the control data 168 comes from the second mobile device 140 (which is not associated with the first zone/first time period). After discarding or ignoring the control data from the unauthorized source, the UAV 102 continues flying along the path in the current zone, at 508. In some examples, the UAV may disregard transmissions from non-authorized pilots without determining that the transmissions include control data (e.g., the transmission may be disregarded without being fully decoded/decrypted). It is to be understood that as used herein, "disregarding" a communication from an unauthorized pilot includes operating in a manner so that receipt of such a communication is inhibited or prevented, such as through the use of frequency hopping and/or directional antenna communication/beamforming as an illustrative non-limiting examples.

As the UAV 102 approaches a boundary between zones (e.g., as a current time period ends and a new time period begins), the UAV 102 performs a handoff operation and enters a new zone, at 512. For example, as the UAV approaches a boundary between the first zone and a second zone, a handoff operation is performed to handoff control from the first mobile device 120 to the second mobile device 140, as described with reference to FIGS. 1-4. After performing the handoff operation, the UAV 102 returns to flying along the path in the current zone, at 508, and receiving any control data from the set of pilots associated with the current zone. This may continue for multiple zones (e.g., multiple handoffs may occur, as described with reference to FIG. 3), until the UAV 102 arrives at the destination, and the UAV hovers, at 504. The UAV may then receive a set down (e.g., a land or power down) command, and may transition to a powered-down state, at 502. In this manner, the UAV 102 is able to travel to a destination while being receptive to control data from pilots that have line-of-sight to the UAV 102, as described with reference to FIGS. 1 and 3.

Figure 6:
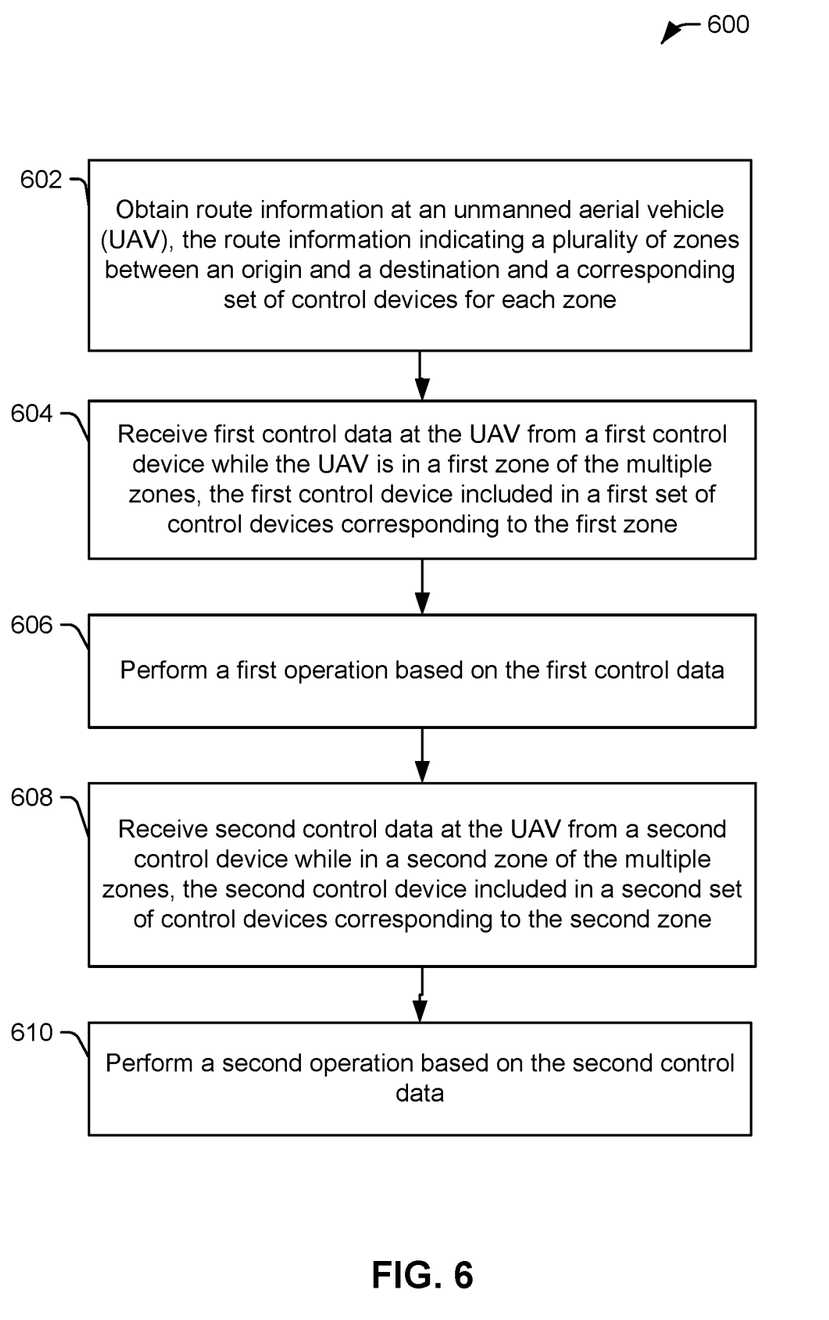
FIG. 6 is a flowchart to illustrate a particular implementation of a method of operation at the UAV of FIG. 1.

Referring to FIG. 6, a particular example of a method 600 of operation of a UAV (e.g., the UAV 102) is shown. The method 600 includes obtaining route information at a UAV, at 602. The route information indicates a plurality of zones between an origin and a destination and a corresponding set of control devices for each zone. For example, the UAV 102 may receive the route information 164 of FIG. 1, which indicates an origin, a destination, and a set of control devices (e.g., a set of pilots) assigned to each zone between the origin and the destination, as described with reference to FIG. 3. In a particular implementation, the route information further includes time periods during which the UAV is scheduled to be in each of the plurality of zones and which set of control devices are assigned to the each of the zones. In a particular implementation, the route information is received via a block of a blockchain, as described with reference to FIG. 1. The block may be received from the first control device, as described with reference to FIG. 1, or from a server, as described with reference to FIG. 2.

The method 600 includes receiving first control data at the UAV from a first control device while in a first zone of the multiple zones, at 604. The first control device is included in a first set of control devices corresponding to the first zone. For example, the UAV 102 may receive the control data 166 from the first mobile device 120 while the UAV 102 is in the first zone. In a particular implementation, the first set of control devices includes multiple control devices. The first control device may be a primary control device, and the multiple control devices may include at least one backup control device.

The method 600 includes performing a first operation based on the first control data, at 606. For example, the UAV 102 may adjust an altitude of the UAV 102, adjust a heading of the UAV 102, adjust a velocity of the UAV 102, hover, land, or a combination thereof.

The method 600 includes receiving second control data at the UAV from a second control device while in a second zone of the multiple zones, at 608. The second control device is included in a second set of control devices corresponding to the second zone. For example, the UAV 102 may receive the control data 168 from the second mobile device 140 while the UAV 102 is in the second zone.

The method 600 further includes performing a second operation based on the second control data, at 610. For example, the UAV 102 may adjust an altitude of the UAV 102, adjust a heading of the UAV 102, adjust a velocity of the UAV 102, hover, land, or a combination thereof.

In a particular implementation, the route information is received from a control device, such as the first mobile device 120 of FIG. 1. Alternatively, the route information may be received from a server, such as the server 202 of FIG. 2. In some implementations, the server may be configured to provide, to the UAV, device IDs of the control devices that are assigned to the route, and the method 600 may further include initiating a communication link with the first control mobile device prior to receiving the control data. For example, the server 202 may send an identifier of the first mobile device 120 to the UAV 102, and the UAV 102 and the first mobile device 120 may initiate a communication link (e.g., a peer-to-peer communication link). In other implementations, the route information may be accessed from a storage device of the UAV, such as a memory card that is preloaded with the route information (and identifiers of the assigned control devices). A payload being transported for delivery by the UAV may include a physical payload (e.g., box or package) and/or a data payload (e.g., stored in a fixed or removable memory at the UAV).

In a particular implementation, the method 600 also includes receiving third control data from a third control device while the UAV is in the first zone. In this implementation, the method 600 also includes discarding the third control data if the third control device is not included in the first set of control devices, discarding the third control data if the third control device is in the first set of control devices but the third device is not associated with a current pilot of the UAV 102 and the UAV 102 is in communication with the control device of the current pilot, or implement the third control data if the third control device is included in the first set of control devices and the UAV 102 is not able to communicate with the control device of the current pilot. In this manner, the UAV 102 responds to control data from the set of control devices corresponding to the current time period (e.g., the zone the UAV 102 is currently located within) and not to other control devices.

Figure 7:
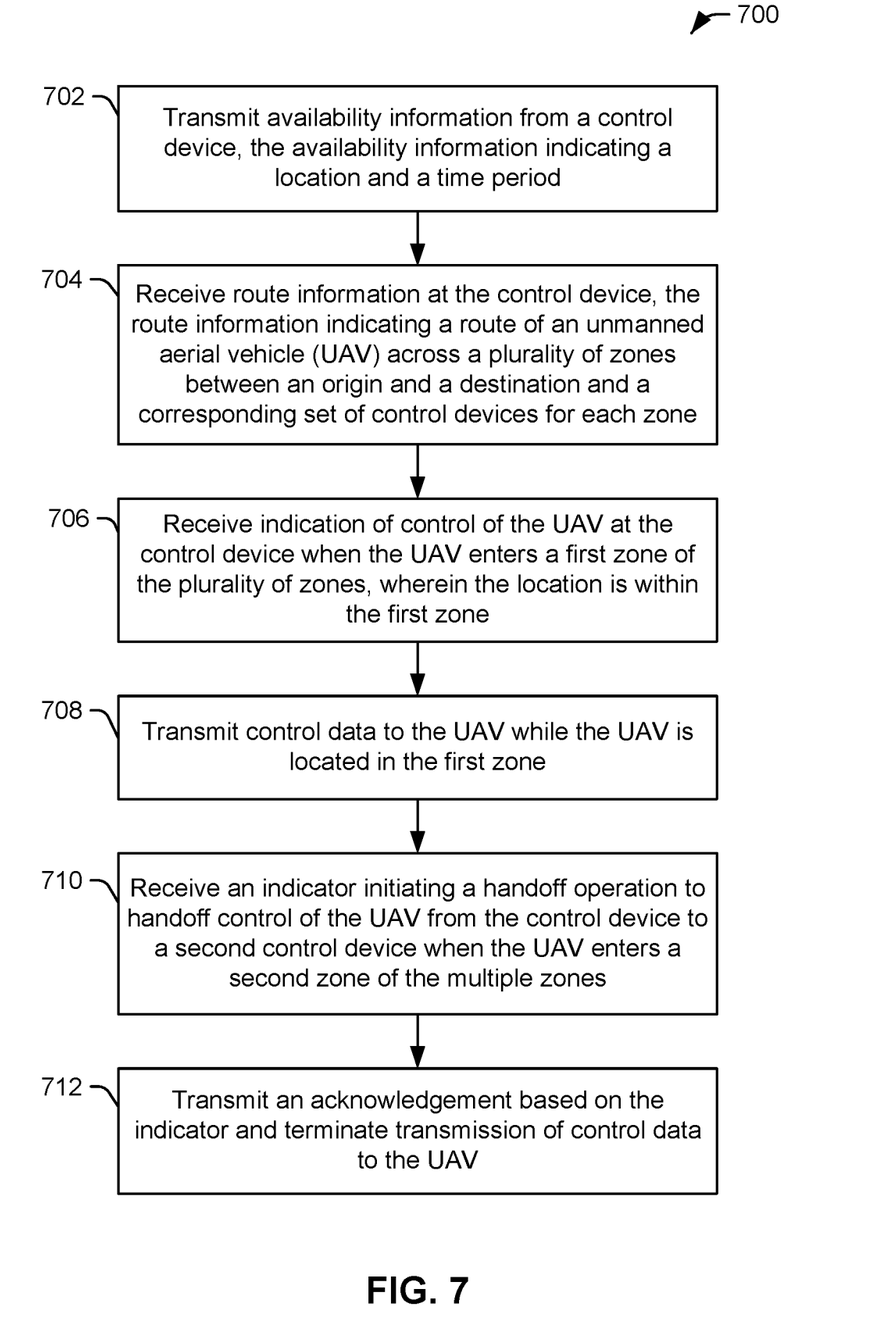
FIG. 7 is a flowchart to illustrate a particular implementation of a method of operation at the first mobile device of FIG. 1.

Referring to FIG. 7, a particular example of a method 700 of operation of a control device (e.g., the first mobile device 120) is shown. The method 700 includes transmitting availability information from the control device, at 702. The availability information indicates a location and a time period. For example, the first mobile device 120 of FIG. 1 may transmit the availability information 160.

The method 700 includes receiving route information at the control device, at 704. The route information includes a route of a UAV across a plurality of zones between an origin and a destination and a corresponding set of control devices for each zone. For example, the first mobile device 120 may receive the route information 164 (e.g., from a server, such as the server 202 of FIG. 2, or from another device that generated the route information 164).

The method 700 includes receiving indication of control of the UAV at the control device. The indication may be received as the UAV approaches or enters a first zone of the plurality of zones, at 706. The location from the availability information is within the first zone.

The method 700 includes transmitting control data to the UAV while the UAV is located in the first zone, at 708. For example, during a first time period that corresponds to the UAV being scheduled to be located within the first zone, the first mobile device 120 of FIG. 1 may transmit the control data 166.

The method 700 includes receiving an indicator initiating a handoff operation to handoff control of the UAV from the control device to a second control device when the UAV enters (or is about to enter) a second zone of the multiple zones, at 710. For example, the first mobile device 120 of FIG. 1 may receive the handoff initiation 170.

The method 700 further includes transmitting an acknowledgement based on the indicator and terminating transmission of control data to the UAV, at 712. For example, the first mobile device 120 of FIG. 1 may terminate transmission of the control data 166 and may transmit the handoff ACK 172. In some examples, transmission of the control data 166 is not terminated until the UAV 102 or the second mobile device 140 indicate to the first mobile device 120 that communication between the UAV 102 and the second mobile device 140 has been established (i.e., a make-before-break handoff). Alternatively, transmission of the control data 166 is terminated before confirmation that communication between the UAV 102 and the second mobile 140 device has been established (i.e., a break-before-make handoff).

It is to be understood that the division and ordering of steps described herein, and shown in the flowcharts of FIG. 6 and FIG. 7, is for illustrative purposes only and is not be considered limiting. In alternative implementations, certain steps may be combined and other steps may be subdivided into multiple steps. Moreover, the ordering of steps may change.

In conjunction with the described aspects, an apparatus includes a processor and a memory storing instructions executable by the processor to perform operations including obtaining route information. The route information indicates a plurality of zones between an origin and a destination and a corresponding set of control devices for each zone. The operations include receiving first control data from a first control device while in a first zone of the multiple zones. The first control device is included in a first set of control devices corresponding to the first zone. The operations further include receiving second control data from a second control device while in a second zone of the multiple zones. The second control device is included in a second set of control devices corresponding to the second zone.

In conjunction with the described aspects, a method includes obtaining route information at an unmanned aerial vehicle (UAV). The route information indicates a plurality of zones between an origin and a destination and a corresponding set of control devices for each zone. The method includes receiving first control data at the UAV from a first control device while in a first zone of the multiple zones. The first control device is included in a first set of control devices corresponding to the first zone. The method further includes receiving second control data at the UAV from a second control device while in a second zone of the multiple zones. The second control device is included in a second set of control devices corresponding to the second zone.

In conjunction with the described aspects, a computer-readable storage device stores instructions that, when executed, cause a computer to perform operations including obtaining route information at an unmanned aerial vehicle (UAV). The route information indicates a plurality of zones between an origin and a destination and a corresponding set of control devices for each zone. The operations include receiving first control data at the UAV from a first control device while in a first zone of the multiple zones. The control mobile device is included in a first set of control devices corresponding to the first zone. The operations further include receiving second control data at the UAV from a second control device while in a second zone of the multiple zones. The second control device is included in a second set of control devices corresponding to the second zone.

In conjunction with the described aspects, a method includes obtaining route information at an externally controllable vehicle. The route information indicates a plurality of zones between an origin and a destination and indicates a corresponding set of control devices for each zone of the plurality of zones. The plurality of zones includes a first zone and a second zone. The method includes sending a handoff initiation message from the externally controllable vehicle to at least one control device of a first set of control devices as the externally controllable vehicle approaches a boundary between the first zone and the second zone. The method includes receiving, at the externally controllable vehicle, an acceptance from a particular control device of the first set. The method also includes, in response to the acceptance from the particular control device, enabling, at the externally controllable vehicle, remote control of the externally controllable vehicle via control signals received from the particular control device during presence of the externally controllable vehicle in the second zone.

In conjunction with the described aspects, a control device for an externally controllable vehicle includes a processor and a memory storing instructions. The instructions are executable by the processor to obtain route information for the externally controllable vehicle. The route information indicates a first zone of a plurality of zones between an origin and a destination of the externally controllable vehicle. The processor is scheduled to be in the first zone during a particular time period. The instructions are executable by the processor to receive a handoff initiation message associated with the externally controllable vehicle during the particular time period. The instructions are executable by the processor to send an acceptance message to the externally controllable vehicle responsive to first user input indicating acceptance of the handoff. The instructions are executable by the processor to receive, responsive to sending the acceptance message, a control message from the externally controllable vehicle indicating an ability to control the externally controllable vehicle while the externally controllable vehicle is in the first zone of the plurality of zones. The instructions are also executable by the processor to send one or more control signals to the externally controllable vehicle after receipt of the control message, while the externally controllable vehicle is in the first zone, and responsive to second user input.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a non-transitory computer-readable medium, or computer-readable storage device, having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. Thus, also not shown in FIG. 1, the system 100 may be implemented using one or more computer hardware devices (which may be communicably coupled via local and/or wide-area networks) that include one or more processors, where the processor(s) execute software instructions corresponding to the various components of FIG. 1. Alternatively, one or more of the components of FIG. 1 may be implemented using a hardware device, such as a field-programmable gate array (FPGA) device, an application-specific integrated circuit (ASIC) device, etc. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
obtaining route information at an externally controllable vehicle, the route information indicating a plurality of zones for traversal by the externally controlled vehicle between an origin and a destination and indicating a corresponding set of control devices for each zone of the plurality of zones, the plurality of zones dividing an area between the origin and destination and including a first zone and a second zone;
determining, by the externally controllable vehicle, that the externally controllable vehicle is approaching a boundary between the first zone and the second zone;
in response to detecting that the externally controllable vehicle is approaching the boundary, sending a handoff initiation message from the externally controllable vehicle to at least one control device of a first set of control devices;
in response to receiving an acceptance from the particular control device, enabling, at the externally controllable vehicle, remote control of the externally controllable vehicle via control signals received from the particular control device during presence of the externally controllable vehicle in the second zone.

2. The method of claim 1, further comprising sending a control notification from the externally controllable vehicle to the particular control device responsive to receipt of the acceptance and a determination by the externally controllable vehicle to accept the control signals from the particular control device, wherein the control notification informs a user of the control device that the particular control device is currently capable of controlling the externally controllable vehicle.

3. The method of claim 1, further comprising:
receiving, at the externally controllable vehicle, control data from the particular control device while the externally controllable vehicle is in the second zone; and
implementing the control data at the externally controllable vehicle to control the externally controllable vehicle.

4. The method of claim 1, further comprising, in response to receipt of the acceptance, sending status data to the particular control device.

5. The method of claim 1, wherein the obtaining the route information comprises receiving the route information from a control device or from a server.

6. The method of claim 1, wherein the obtaining the route information comprises received the route information via a block of a blockchain.

7. The method of claim 1, wherein the sending the handoff initiation message to the at least one control device comprises sending the handoff initiation message to a primary control device associated with the second zone, the primary control device identified in the first set.

8. The method of claim 7, further comprising sending a second handoff initiation message to a backup control device identified in the first set responsive to not receiving the acceptance from the primary control device.

9. The method of claim 1, wherein the externally controllable vehicle comprises an unmanned aerial vehicle.

10. A control device for an externally controllable vehicle, the control device comprising:
a processor; and
a memory storing instructions, the instructions executable by the processor to:
obtain route information for the externally controllable vehicle, the route information indicating a first zone of a plurality of zones for traversal by the externally controlled vehicle between an origin and a destination of the externally controllable vehicle, wherein the processor is scheduled to be in the first zone during a particular time period, and wherein the plurality of zones divide an area between the origin and destination;
receive from the externally controllable vehicle, a handoff initiation message associated with the externally controllable vehicle during the particular time period;
send an acceptance message to the externally controllable vehicle responsive to first user input indicating acceptance of the handoff;
receive, responsive to sending the acceptance message, a control message from the externally controllable vehicle indicating an ability to control the externally controllable vehicle while the externally controllable vehicle is in the first zone of the plurality of zones; and
send one or more control signals to the externally controllable vehicle after receipt of the control message, while the externally controllable vehicle is in the first zone, and responsive to second user input.

11. The control device of claim 10, wherein the instructions are further executable by the processor to receive an end message after handoff of control of the externally controllable vehicle to another control device, the end message indicating an inability to control the externally controllable vehicle.

12. The control device of claim 10, wherein the instructions are further executable by the processor to receive and display status information received from the externally controllable vehicle.

13. The control device of claim 10, wherein the instructions are further executable by the processor to send, based on information included in the route information, a second handoff message to another control device in response to the externally controllable vehicle approaching a boundary to another zone.

14. The control device of claim 10, wherein the route information is received from a server or another control device.

15. The control device of claim 10, wherein the handoff initiation message is received from the externally controllable vehicle or from another control device.

16. A non-transitory computer-readable medium storing instructions that, when executed by a processor, cause the processor to perform operations, the operations comprising:
obtaining route information at an unmanned aerial vehicle (UAV), the route information indicating a plurality of zones for traversal by the externally controlled vehicle between an origin and a destination and indicating a corresponding set of mobile devices for each zone, wherein the plurality of zones divides an area between the origin and destination and including a first zone and a second zone;
determining, by the UAV, that the UAV is approaching a boundary between the first zone of the plurality of zones and the second zone of the plurality of zones;
in response to detecting that the UAV is approaching the boundary, sending a handoff initiation message from the UAV to at least one mobile device; and
in response to receiving an acceptance from a particular mobile device, enabling, at the UAV, remote control of the UAV via control signals received from the particular mobile device during presence of the UAV in the second zone.

17. The non-transitory computer-readable medium of claim 16, wherein the operations further comprise performing one or more procedures at the UAV based on first control data, second control data, or both.

18. The non-transitory computer-readable medium of claim 17, wherein the one or more procedures include adjusting an altitude of the UAV, adjusting a heading of the UAV, adjusting a velocity of the UAV, causing the UAV to hover, causing the UAV to land, or a combination thereof.

19. The non-transitory computer-readable medium of claim 16, wherein the operations further comprise:
receiving first control data at the UAV from a first mobile device while the UAV is in the first zone, the first mobile device included in the first set of mobile devices corresponding to the first zone;
receiving second control data at the UAV from a second mobile device while the UAV is in the second zone, the second mobile device included in a second set of mobile devices corresponding to the second zone;
receiving third control data from a third mobile device while the UAV is in the first zone, wherein the third mobile device is not included in the first set of mobile devices; and
discarding the third control data.

20. The non-transitory computer-readable medium of claim 16, wherein the route information indicates time periods during which the UAV is scheduled to be in each of the plurality of zones.

* * * * *